United States Patent [19]
Takahashi

[11] Patent Number: 5,783,233
[45] Date of Patent: Jul. 21, 1998

[54] COOLING DEVICE OF AN INJECTION MOLD FOR MAKING AN OPTICAL DISK SUBSTRATE

[75] Inventor: Mitsuo Takahashi, Matsudo, Japan

[73] Assignee: Seikoh Giken Co., Ltd., Chiba-Ken, Japan

[21] Appl. No.: 758,446

[22] Filed: Nov. 29, 1996

[30] Foreign Application Priority Data

Dec. 12, 1995 [JP] Japan .................................. 7-346394

[51] Int. Cl.$^6$ .................................................. B29C 45/73
[52] U.S. Cl. .................... 425/547; 264/107; 264/328.16; 425/548; 425/552; 425/810
[58] Field of Search ............................ 425/552, 547, 425/548, 810; 264/106, 107, 328.14, 328.16

[56] References Cited

U.S. PATENT DOCUMENTS

| | | |
|---|---|---|
| 3,181,200 | 5/1965 | Joseph . |
| 4,260,360 | 4/1981 | Holmes et al. . |

FOREIGN PATENT DOCUMENTS

| | | |
|---|---|---|
| 32260/68 | 7/1969 | Australia . |
| 60-18527 | 5/1985 | Japan . |
| 147865 | 1/1922 | United Kingdom . |
| 319894 | 10/1929 | United Kingdom . |

OTHER PUBLICATIONS

"Injection Mold", Nikkan Kogyo Shimbunsha, 1973, p. 175.

*Primary Examiner*—Tim Heitbrink
*Attorney, Agent, or Firm*—Spencer & Frank

[57] ABSTRACT

A cooling device of an injection mold for an optical disk substrate reduces the chances of cavitation caused by a turbulent flow of passing cooling water, thus enabling a disk cavity plate to be cooled uniformly. A plurality of main arc-shaped passages, which have the same cross-sectional shape and which are concentrically arranged, are provided at a pitch "p" from the inner circumference on the rear surface of the disk cavity plate of the optical disk substrate injection mold. Further provided are a connecting arc-shaped passage having a radius of "p" which connects a first main arc-shaped passage having a radius of $R_1$ with a second main arc-shaped passage having a radius of $R_2$, and the centerline of which is tangentially connected to the second main arc-shaped passage, and which has the same cross-sectional shape; and a connecting segment-like passage, the centerline of which is tangentially connected to the connecting arc-shaped passage and the first main arc-shaped passage having the radius of $R_1$, and which has the same cross-sectional shape. In a similar manner, main arc-shaped passages are connected one after another to constitute the cooling device of the injection mold for the optical disk substrate.

9 Claims, 4 Drawing Sheets

PRIOR ART

PRIOR ART

COOLING DEVICE OF AN INJECTION MOLD FOR MAKING AN OPTICAL DISK SUBSTRATE

BACKGROUND OF THE INVENTION

1. Field of the Invention

The present invention relates to a cooling device of an injection mold for an optical disk substrate for cooling the cavity of the injection mold for making an optical disk substrate. Specifically, the invention relates to a device for a CD-ROM and the like.

2. Description of the Related Art

Referring to typical conventional molding machines, the arrangements and configurations of the devices thereof for cooling the cavities of the optical disk substrate injection molds will be described, then problems with the cooling devices will be discussed.

FIG. 4 is a side cross-sectional view of an essential section of a typical optical disk substrate injection mold when the mold is in a clamped state. A cavity is formed between a cavity side disk cavity plate 1 and a movable disk cavity plate 10. A stamper plate 3 has the central hole thereof held by the jaw of a stamper plate holding means 4 so that it is brought in close contact with the cavity side disk cavity plate 1. Provided at the center of the cavity side disk cavity plate 1 is a hole 2 for receiving the stamper plate holding means 4. One end of a sprue bush 5 is exposed to the cavity hollow, the sprue bush 5 passing through the centers of a cavity side base plate 9, the cavity side disk cavity plate 1, and the stamper plate holding means 4. A concentric groove 6 is provided in the cavity side disk cavity plate 1 in such a manner that the groove forms a single cooling water channel. Cooling water is poured through an inlet port 7, circulated through the cooling water groove 6, and drained through an outlet port 8.

A cutting punch 13 for punching a central hole in a disk substrate molded piece 12 is inserted in a central hole 11 of a movable base plate 17 and the movable disk cavity plate 10, the central axis thereof being aligned with that of the central hole 11.

The movable side is also provided with a cooling water groove 14 which is concentrically disposed to form a single cooling water channel. The cooling water is poured through a port 15, circulated through the cooling water groove 14, and drained through a port 16. The leakage of the cooling water is prevented by O-rings 18, 19, 20, and 21 for preventing water leakage.

A recent optical disk substrate injection mold for CDs, CD-ROMs, and the like is required to perform high-speed molding, namely, 3 to 4 seconds per cycle. For such high-speed molding operation, it is necessary to instantly and uniformly transfer a large amount of heat, which is transferred to the surfaces of the respective disk cavity plates 1 and 10 from hot injected resin, to the cooling water which is forcibly circulated through the cooling groove assemblies disposed on the rear surfaces of the disk cavity plates in order to remove the heat. Properly performing such cooling is essential for maintaining uniform optical characteristics, including birefringence, of optical disk substrates.

Accordingly, good design of the cooling water grooves is an important factor in deciding the capability of the optical disk substrate injection mold and the quality of the optical disk substrates. One of the factors involved in the performance of the cooling water groove is the arrangement and shape of the cooling water groove. The volume of water circulated during such high-speed molding ranges about 8 to 10 liters per minute. The cross-sectional area of the cooling water groove is restricted to approximately 1 cm$^2$ and therefore the flow rate of the cooling water passing through the cooling water groove reaches about 1.3 to 1.6 m/sec. Hydrodynamically, if Reynold's number is Re>2600, then Re=1.3×10$^5$. A place having completely turbulent flow tends to develop a cavitation phenomenon wherein 2 to 3% merged in the cooling water turns into bubbles. The bubbles adhering to the wall surface of the cooling water groove form an insulating layer which significantly deteriorates the cooling capability of the affected area of the cooling water groove, resulting in uneven cooling. To avoid such uneven cooling, the shape of the cooling water groove must be designed to be as smooth as possible.

For that purpose, various cooling water groove designs have been proposed. A cooling water passage which is composed of concentric grooves connected as shown in FIG. 2 has been disclosed in Japanese Patent Publication No. 60-185275 based on U.S. patent application Ser. No. 847367. As shown in FIG. 2, the cooling water passage has a plurality of arc-shaped cooling water grooves $27_1$, $27_2$, and $27_3$ which are concentrically disposed and which have radii of $R_1$, $R_2$, and $R_3$, respectively. The cooling water grooves $27_1$ and $27_2$ are connected through a connecting groove $B_1$ which extends from a point 32 to a point 33 and which has a tilt of $\theta_2$ (=45 degrees); the cooling water grooves $27_2$ and $27_3$ are connected by a connecting groove $B_2$ which extends from a point 34 to a point 35 and which has the tilt of $\theta_2$. The cooling water enters through an inlet port 28 and it is drained through an outlet port 29. Reference numerals 30 and 31 define the area wherein the O-rings are disposed.

The cooling water passage shown in FIG. 2 allows a triple cooling water groove assembly to be provided in the area wherein the O-rings are disposed, enabling higher cooling efficiency. A cooling water groove assembly 27, however, has four bent sections 32, 33, 34, and 35 in the middle thereof; these sections are frequently responsible for developing a swirling loss and the cavitation phenomenon caused by the breakaway of the water flow which takes place at the bent sections.

A centrifugal design has been proposed on page 175 of "Injection Mold" published by Nikkan Kogyo Shimbunsha in 1973. FIG. 3 shows a cooling groove having the centrifugal design. A cooling water groove 22 is centrifugal; the water coming in through a cooling water inlet port 23 is drained through an outlet port 24. Reference numerals 25 and 26 define the area wherein the O-rings are disposed. The centrifugal cooling water groove is smooth with no bent points in the middle thereof and it is advantageous in that the cavitation phenomenon hardly takes place. This design, however, allows only a double cooling water groove to be disposed in the same area wherein the O-rings are disposed and wherein a triple concentric cooling water groove could be provided. There is another shortcoming: the configuration of this type of groove inherently involves inner and outer circumferential areas where sufficient cooling cannot be performed. These areas of poor cooling 44 and 45 are shown in FIG. 3 as the areas enclosed with the dashed lines.

The cooling device of the injection mold for optical disk substrates shown in FIG. 2 does not exhibit the uneven cooling which is observed in the conventional device shown in FIG. 3; the cooling device permits higher cooling efficiency since it makes it possible to provide the triple cooling water groove in the area wherein the O-rings are disposed. As previously described, however, the cooling device shown in FIG. 2 is disadvantageous in that the cooling water groove assembly 27 has four bent points 32, 33, 34, and 35 at which the whirling loss and the cavitation phenomenon tend to occur because of the breakaway of the water flow.

Loss factor $\zeta$ based on the bends of the water passage is given by the following expression by J. Weisbach (see Note 1 below):

$$\zeta = 0.946 \sin^2(\theta_2/2) + 2.05 \sin^4(\theta_2/2)$$

where $\theta_2$: Bend angle of water passage

Note 1: J. Weisbach, "Ingeneieur Mascinen Mechanik" (1896) p. 1044.

In the case of the example shown in FIG. 2, if the above expression is applied on the assumption that the water passage has four bends, the bend angle being $\theta_2=45$ degrees, then the total loss factor $\Sigma\zeta \approx 0.48$, a large value. The centrifugal cooling water groove shown in FIG. 3 is free of such bent sections and therefore it does not incur such a loss.

SUMMARY OF THE INVENTION

Accordingly, an object of the present invention is to provide a cooling device of a mold injection for an optical disk substrate, which cooling device is capable of uniformly cooling a disk cavity plate by achieving smooth connection of concentric cooling grooves provided on the rear surface of the disk cavity plate so as to form a single cooling groove assembly which has the same flow direction, thereby controlling the cavitation attributable to a turbulent flow of the passing cooling water.

To this end, according to the present invention, there is provided a cooling device of an injection mold for an optical disk substrate, wherein a plurality of main arc-shaped passages ($R_1$ through $R_n$), which share the same cross-sectional shape and which are concentrically arranged, are provided at a pitch "p" from the inner circumferential on the rear surface of a disk cavity plate of an optical disk substrate injection mold, and are connected in sequence to share the same water flow direction so as to form a single, continuous, approximately centrifugal cooling water passage; the cooling device being equipped with:

a connecting arc-shaped passage having a radius of $(i-1)$ p, which connects an $(i-1)$th main arc-shaped passage having a radius of $R_{(i-1)}$ with an $(i)$th main arc-shaped passage having a radius of $R_i$ so that the centerline thereof is tangentially connected to the $(i)$th main arc-shaped passage, and which has the same cross-sectional shape; and a connecting segment-like passage, the centerline of which is tangentially connected to the connecting arc-shaped passage and the $(i-1)$th main arc-shaped passage having the radius of $R_{(i-1)}$ and which shares the same cross-sectional shape; and an outlet and an inlet for a refrigerant which are respectively connected to an open end of the main arc-shaped passage ($R_1$) on the innermost circumference and to an open end of the main arc-shaped passage ($R_n$) on the outermost circumference.

In a preferred form, the plurality of connecting arc-shaped passages are arranged so that they are concentric with respect to each other and said plurality of connecting segment-like passages are arranged in parallel to each other.

In another preferred form, the passages are provided in the cavity plate and are covered with a base plate, the cross sections thereof being approximately rectangular.

In yet another preferred form, the cooling device is provided on a cavity side disk cavity plate and a movable disk cavity plate, respectively, of the injection mold for the optical disk substrate.

DESCRIPTION OF THE PREFERRED EMBODIMENT

Figure 1:
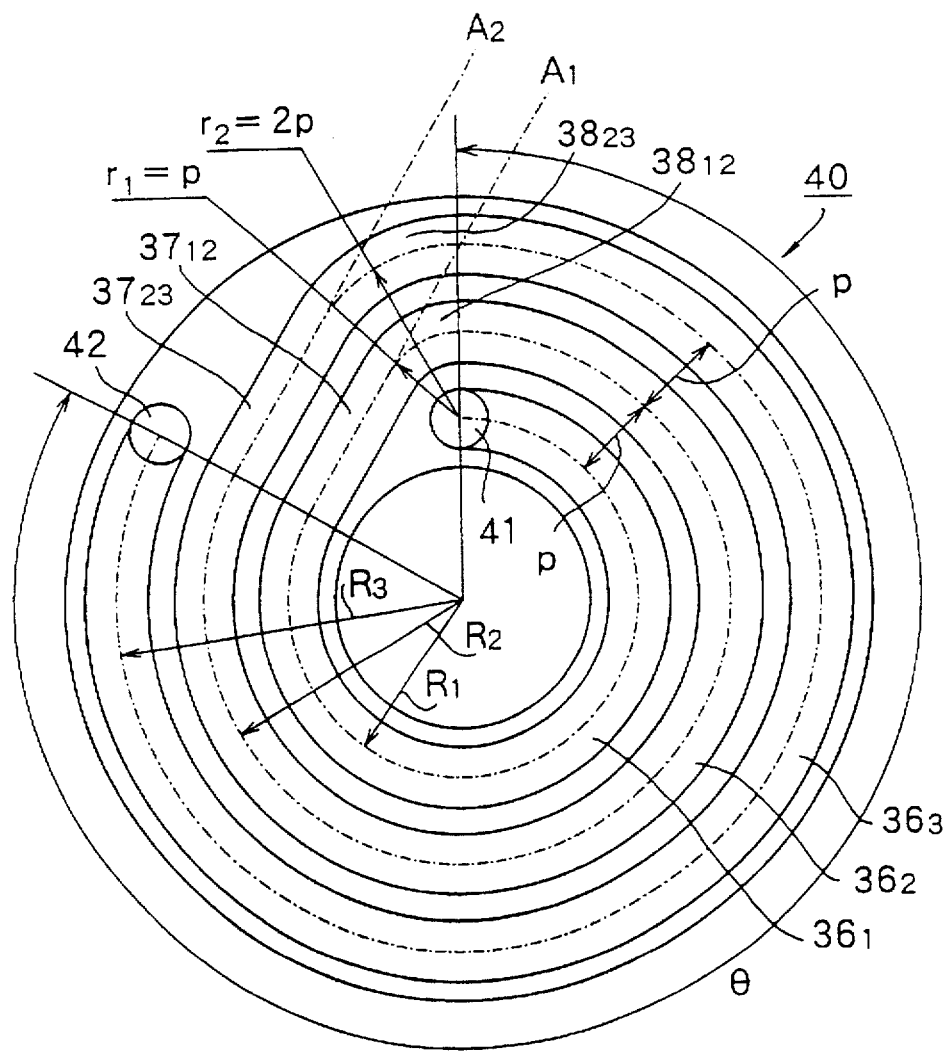
FIG. 1 is a schematic top plan view illustrative of an embodiment of a cooling water groove assembly on the rear surface of a disk cavity plate of an injection mold for making an optical disk substrate to which a cooling device of an injection mold for making an optical disk substrate according to the present invention is applied.
Figure 4:
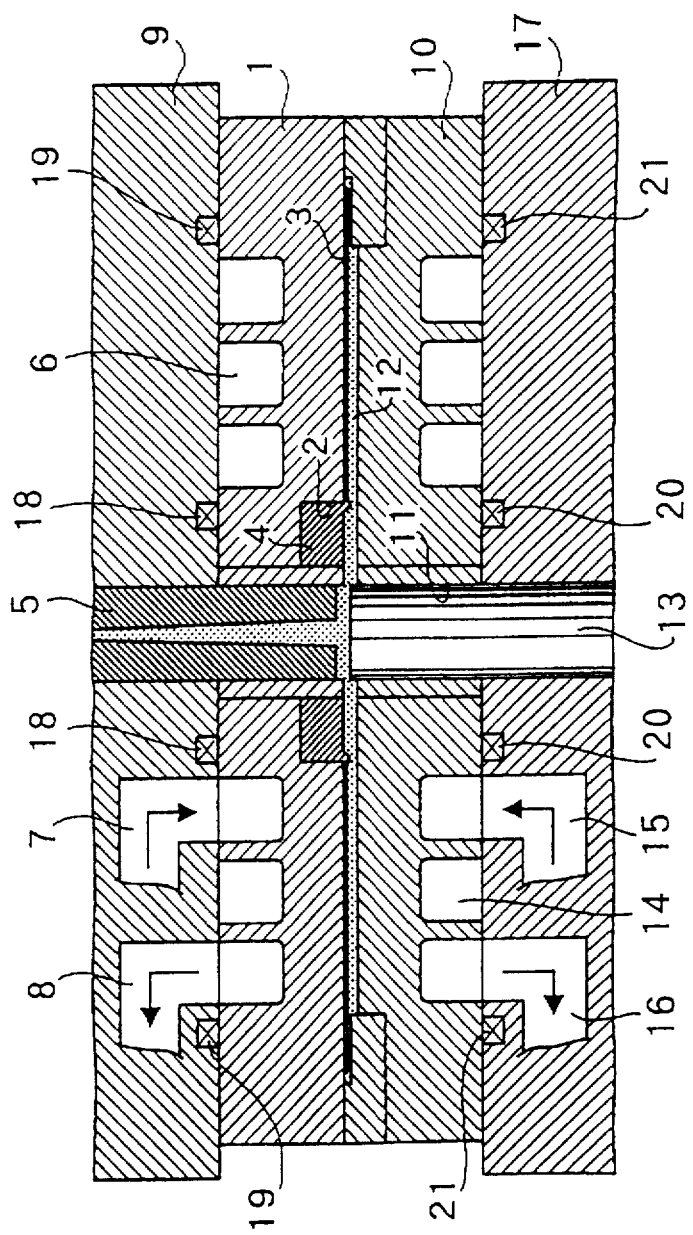
FIG. 4 is a cross-sectional view of an essential section of a typical conventional injection mold for the optical disk substrate when the injection mold is in a clamped state.

Referring mainly to the accompanying drawings, an embodiment of the cooling device of an injection mold for an optical disk substrate in accordance with the present invention will be described in further detail. FIG. 1 is a schematic top plan view illustrative of the construction of an embodiment of a cooling water passage assembly on the rear surface of a disk cavity plate of an injection mold for making an optical disk substrate to which the cooling device of the injection mold for making the optical disk substrate according to the present invention is applied. The rear surface of a disk cavity plate 40 of the injection mold for making the optical disk substrate is provided with concentric main arc-shaped grooves $36_1$, $36_2$, $36_3$, connecting arc-shaped grooves $38_{12}$ and $38_{23}$, and connecting segment-like grooves $37_{12}$ and $37_{23}$. These grooves are covered with a base plate which is not shown, the cavity side base plate 9 shown in FIG. 4, or a base plate which corresponds to the movable base plate 17; these base plates constitute a passage which has a rectangular cross section. The radii of the grooves are denoted by $R_1$, $R_2$, and $R_3$ in order from the one on the innermost circumference. A pitch of the width of the grooves is denoted by $p=R_3-R_2=R_2-R_1$. The connection between the main arc-shaped groove $36_1$ and the main arc-shaped groove $36_2$ will now be described. These grooves are provided so that the centerline of the connecting arc-shaped groove $38_{12}$ having a radius $p=r_1$ measured from the center of an inlet port 41 through which cooling water enters arc-shaped groove $36_1$ is tangentially connected to the centerline of the arc-shaped groove $36_2$. The connecting segment-like groove $37_{12}$ is provided so that the centerline thereof is connected tangentially to both the centerline of the connecting arc-shaped groove $38_{12}$ and the centerline of the arc-shaped groove $36_1$.

The connection between the main arc-shaped groove $36_2$ and the main arc-shaped groove $36_3$ will now be described. These grooves are provided so that the centerline of the connecting arc-shaped groove $38_{23}$ having a radius 2p measured from the center of the inlet post 41 is tangentially connected to the centerline of the arc-shaped groove $36_3$. The connecting segment-like groove $37_{23}$ is provided so that the centerline thereof is connected tangentially to both the centerline of the connecting arc-shaped groove $38_{23}$ and the centerline of the arc-shaped groove $36_2$.

The connecting arc-shaped groove $38_{12}$ (radius 2p) and the connecting arc-shaped groove $38_{23}$ (radius 2p) are concentrically arranged. The connecting segment-like grooves $37_{12}$ and $37_{23}$ are disposed in parallel to each other. The cooling water is supplied from outside through the inlet port 41 for cooling water. The cooling water then circulates through the disk in the order of the main arc-shaped groove $36_1$, the segment-like connecting groove $37_{12}$, the connection arc-shaped groove $38_{12}$, the main arc-shaped groove $36_2$, the segment-like connecting groove $37_{23}$, the connecting arc-shaped groove $38_{23}$, the main arc-shaped groove $36_3$, and an outlet port 42, thereby carrying out heat exchange.

Loss factor $\zeta$ in the embodiment according to the present invention can be calculated from the expression given below which is shown on page 1046 of the document which has been referred to in Note 1 above:

$$\zeta = [0.131 + 0.1632(d/r)^{3.5}](\theta_1/90)$$

where d: Diameter of the water passage $r_1 = 1.3$ cm $r_2 = 2.6$ cm $\zeta_1 = 30$ degrees Calculating the total loss factor ($\Sigma\theta$) according to the expression gives $\Sigma\theta \approx 0.11$. This means that the embodiment of the invention enables a significantly reduced total loss, approximately 78%, in comparison with the total loss factor $\Sigma\theta \approx 0.48$ in the example of the conventional cooling water groove which has been described with reference to FIG. 2.

Figure 2:
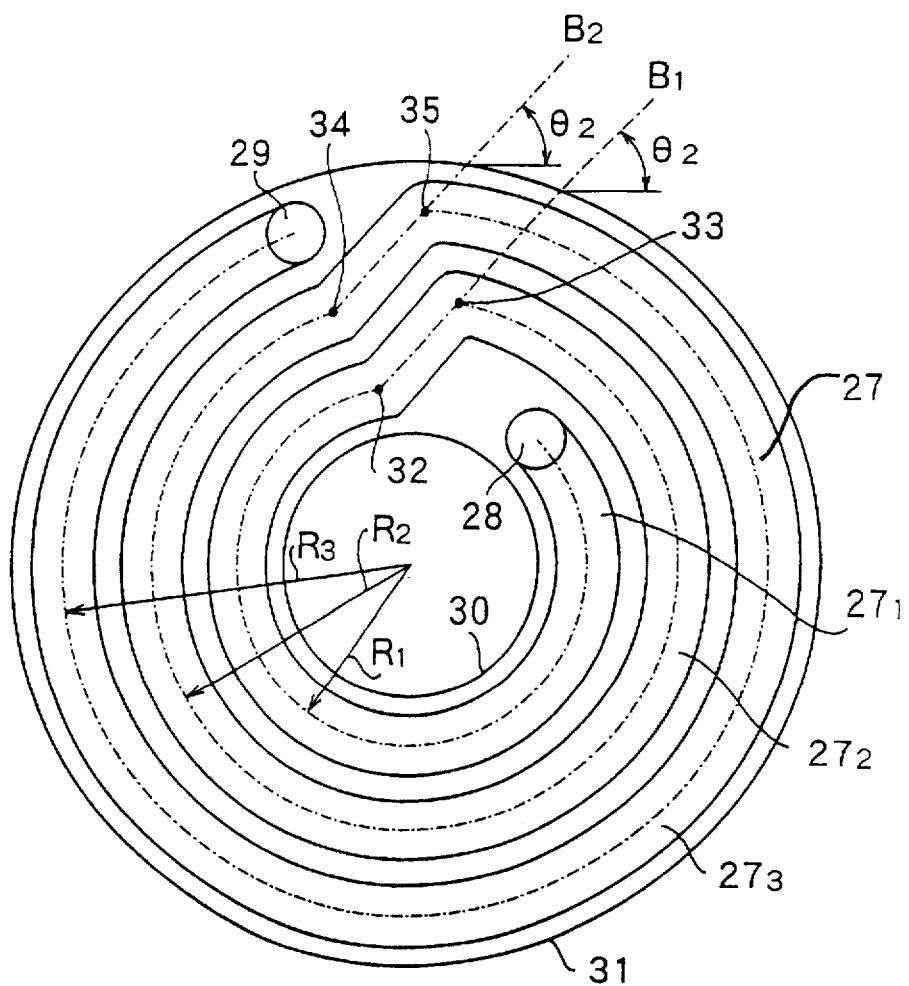
FIG. 2 is a schematic diagram illustrative of a cooling water passage composed of conventional concentric grooves which are linearly connected.
Figure 3:
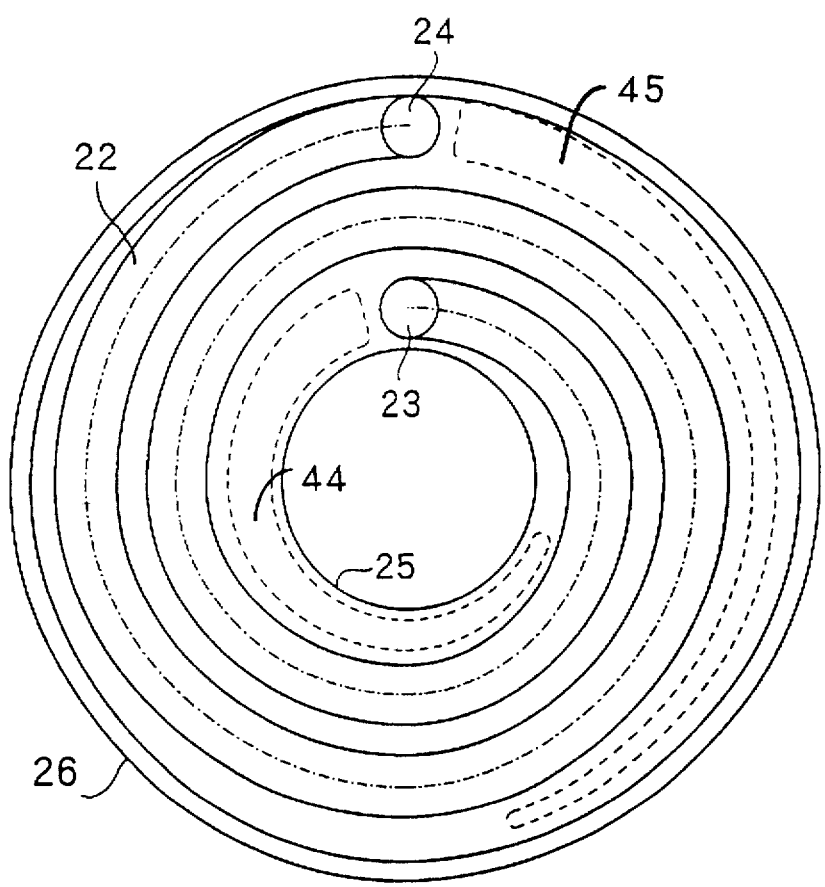
FIG. 3 is a schematic diagram illustrative of the configuration of a conventional centrifugal type cooling water channel.

The cooling water groove assembly of the embodiment in accordance with the present invention has achieved the reduced loss by eliminating bent sections and by smoothly connecting the concentric cooling water grooves; it is free of a plurality of sections which are bent at acute angles as in the conventional concentric cooling water groove assembly illustrated in FIG. 2. Hence, the cooling water groove assembly of the embodiment makes it possible to markedly control the uneven cooling on the surface of the disk cavity plate caused by the whirling loss and the cavitation phenomenon due to the breakaway of the water flow at the bent sections as in the conventional concentric cooling water groove which has been discussed with reference to FIG. 2. Thus, the cooling device in accordance with the invention permits a cooling water flow which is as smooth as that obtained by the centrifugal cooling water groove assembly shown in FIG. 3 and it also enables significantly controlled unevenness in the cooling on the surface of the disk cavity plate attributable to the whirling loss and the cavitation phenomenon due to the breakaway of the water flow.

What is claimed is:

1. A cooling device of an injection mold for making an optical disk substrate, wherein a plurality of concentric main arc-shaped passages are arranged around a center of a disk cavity plate have a radius $R_1$ through $R_n$ respectively, each arc-shaped passage having the same cross-sectional shape throughout the length thereof, said arc-shaped passages being provided on a rear surface of the disk cavity plate, and are connected in sequence to share the same water flow direction so as to form a single, continuous, approximately centrifugal cooling water passage; said cooling device comprising:

a connecting arc-shaped passage having a radius of (i−1)p from a center of an inlet, where i is an integer $\geq 2$ and p is a pitch determined by the radii of the main arc-shaped passages, said connecting arc-shaped passage connecting an (i−1)th main arc-shaped passage having a radius of $R_{(i-1)}$ with an (i)th main arc-shaped passage having a radius of $R_i$, via a connecting segment passage, so that the centerline of said connecting arc-shaped passage is tangentially connected to said (i)th main arc-shaped passage, and which said connecting arc-shaped passage having the same cross-sectional shape as the concentric main arc-shaped passages, the centerline of said connecting segment passage being tangentially connected to the connecting arc-shaped passage and said (i−1)th main arc-shaped passage having the radius of $R_{(i-1)}$ and which shares the same cross-sectional shape of said concentric main arc-shaped passages; and the inlet and an outlet for a refrigerant which are respectively connected to an open end of said main arc-shaped passage having a radius $R_1$ on the innermost circumference of said disk cavity plate and to an open end of said main arc-shaped passage having a radius $R_n$ on the outermost circumference of said disk cavity plate.

2. A cooling device of the injection mold for making an optical disk substrate according to claim 1, wherein said plurality of connecting arc-shaped passages are arranged concentrically with respect to each other and said plurality of connecting segment passages are arranged in parallel to each other.

3. A cooling device of the injection mold for optical disk substrate according to claim 1, wherein said passages are provided in the cavity plate and are covered with a base plate, the cross sections of said passages being approximately rectangular.

4. A cooling device of the injection mold for making an optical disk substrate according to claim 1, said cooling device being provided on a cavity side disk cavity plate and a movable disk cavity plate of the injection mold for the optical disk substrate.

5. A cooling device of an injection mold comprising:

a disk cavity plate having a plurality of concentric main arc-shaped passages arranged around a center of said disk cavity plate and coupled together to form a single continuous passage, each of the main arc-shaped passages having a radius, the single continuous passage comprising:

an inlet for supplying a refrigerant to the single continuous passage and having a center;

a first main arc-shaped passage having first and second sides and a first radius least among the radii of the plurality of main arc-shaped passages, the first side of the first main arc-shaped passage being coupled to the inlet;

a first connecting segment passage having first and second sides, the first side of the first connecting segment passage being coupled to the second side of the first main arc-shaped passage;

a first connecting arc-shaped passage having first and second sides and a radius from the center of the inlet, the first side of the first connecting arc-shaped passage being coupled to the second side of the first connecting segment passage; and a second main arc-shaped passage having first and second sides and a second radius greater than the first radius, the first side of the second main arc-shaped passage being coupled to the second side of the first connecting arc-shaped passage;

an outlet for draining the refrigerant from the single continuous passage and being coupled to a main arc-shaped passage having a radius greatest among the radii of the plurality of main arc-shaped passages;

wherein the radius of the connecting arc-shaped passage is dependent on the first and second radii;

wherein the first main arc-shaped passage, the connecting segment passage, the connecting arc-shaped passage, and the second main arc-shaped passage have a substantially identical cross-sectional shape.

6. The cooling device according to claim 5, further comprising a second connecting segment passage having first and second sides, the first side of the second connecting segment passage being coupled to second side of the second main arc-shaped passage, the first and second connecting segment passages being parallel.

7. The cooling device according to claim 6, further comprising a second connecting arc-shaped passage having first and second sides and a radius from the center of the inlet, the first side of the second connecting arc-shaped passage being coupled to the second side of the second connecting segment passage, the radius of the second connecting arc-shaped passage being twice the radius of the first connecting arc-shaped passage.

8. The cooling device according to claim 5, wherein the single continuous passage is formed in the disk cavity plate;

wherein the cooling device further comprises a base plate covering the disk cavity plate such that the cross-sectional shape of the single continuous passage is approximately rectangular.

9. The cooling device according to claim 5, wherein the disk cavity plate is a cavity side disk cavity plate;

wherein the cooling device further comprises a movable disk cavity plate having a single continuous passage substantially identical to the single continuous passage of the cavity side disk cavity plate.

* * * * *